Feb. 27, 1923.
A. F. CURTIS
SET-UP BLOCK FOR STICKER HEADS
Filed June 20, 1921
1,446,883
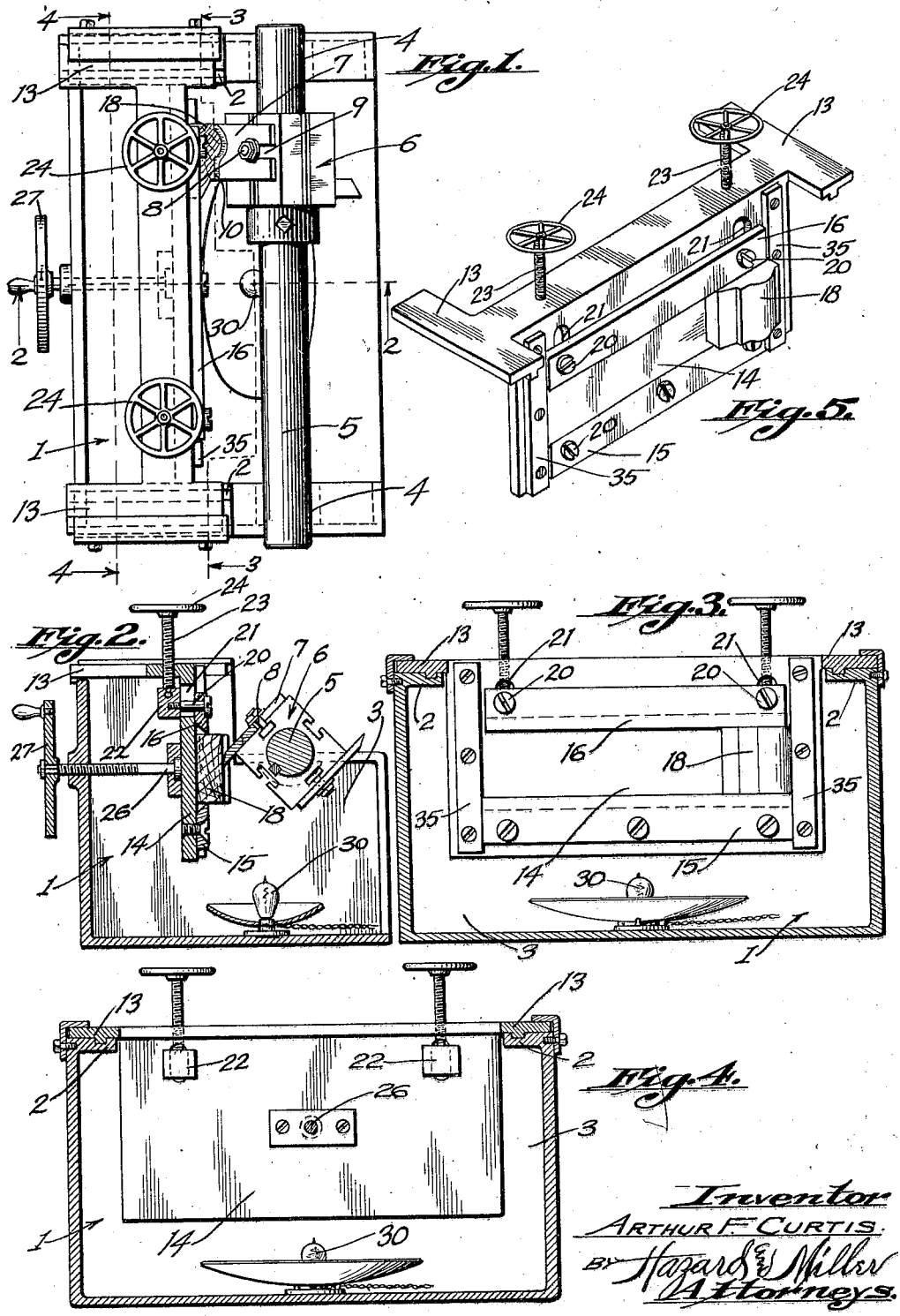

Patented Feb. 27, 1923.

1,446,883

UNITED STATES PATENT OFFICE.

ARTHUR F. CURTIS, OF LOS ANGELES, CALIFORNIA.

SET-UP BLOCK FOR STICKER HEADS.

Application filed June 20, 1921. Serial No. 479,154.

*To all whom it may concern:*

Be it known that I, ARTHUR F. CURTIS, a citizen of the United States, residing at Los Angeles, in the county of Los Angeles and State of California, have invented new and useful Improvements in Set-Up Blocks for Sticker Heads, of which the following is a specification.

It is the object of this invention to provide means whereby the blades of a sticker may be properly adjusted upon a sticker head, so that when the sticker head is mounted in a planing machine it will function to produce work of a desired conformation.

More specifically the invention provides a set up block which includes means for clamping a sample of the work which is to be reproduced, and also a removable mandrel adapted to receive the sticker head. The mandrel and clamp are in the same relative position as the shaft of the planing machine which carries the sticker head and the support for the work, and as a consequence when the blades are adjusted upon the sticker head mounted upon the mandrel of the set up block so as to properly engage the work to be reproduced and which is clamped in the set up block, the blades of the sticker head will be properly adjusted for subsequent use of the sticker head in the planing machine.

The invention will be readily understood from the following description of the accompanying drawings, in which:

Figure 1 is a plan view of a set up block constructed in accordance with the invention.

Fig. 2 is a transverse section on the line 2—2 of Fig. 1.

Figs. 3 and 4 are longitudinal sections on the lines 3—3 and 4—4 of Fig. 1.

Fig. 5 is a perspective view of the clamping member of the set up block.

The apparatus includes a casing 1 forming guideways 2 at the ends thereof and also forming a trough 3 at the front of said casing. The walls of the casing at the ends of this trough form bearings 4 so that a mandrel 5 may be removably supported above said trough.

The mandrel 5 is constructed similar to the shaft of a planing machine adapted to receive a sticker head, and the usual sticker head 6 of such a machine is adapted to be mounted upon the mandrel for supporting said sticker head upon the set up block. The sticker head includes the usual blades 7 which are adjustably positioned by means of bolts 8 received in slots 9 of the blades, and the cutting edges 10 of the blades conform to the contour of the molding which is to be formed.

A clamp for a sample of the work which is to be reproduced, is mounted in guideways 2 for adjustment toward and away from mandrel 5 and the sticker head carried thereby. This clamp includes side supports 13 movable in guideways 2, and a depending apron 14 which carries a fixed clamping jaw 15 and an adjustable clamping jaw 16, so that the sample of the work to be reproduced, as shown at 18, may be clamped between said jaws.

Jaw 16 may be adjusted by having the supporting bolts 20 thereof received through elongated slots 21 in apron 14, and having said bolts connected to blocks 22 which are adjusted up and down by means of screw rods 23 threaded through the clamp and actuated by hand wheels 24. The clamp may be moved back and forth toward and away from mandrel 5 by connecting a screw rod 26 to apron 14 and threading the same through casing 1 with a hand wheel 27 fixed upon said screw rod.

Illuminating means shown as an incandescent lamp 30 is preferably provided in trough 3 beneath mandrel 5, and in operation it will be understood that with a model 18 supported in the clamp, and a sticker head 6 mounted upon mandrel 5 which is supported in its bearings 4, the respective cutter blades 7 are adjusted upon the sticker head so as to conform exactly to the contour of the model. The lamp 30 provides light from below for the operator to readily adjust the cutting edges of the blades and the surface of the model.

It will be understood that the parts are so related that when the blades of a sticker head are properly positioned with relation to the model in the set up block, said blades will be similarly properly positioned with relation to the work when the sticker head is substantially transferred to the planing machine.

The desired definite relation between the sticker head upon mandrel 5 and the model secured in the clamp of the set up block, is accomplished by properly positioning the bearings 4 for the mandrel with relation to the clamp, and also by providing end abutment plates 35 beyond jaws 15—16 of the clamp in order that the model 18 may be clamped in the jaws while abutting against one of said end plates, in order to obtain the desired relative lateral position of the parts.

The apparatus, as thus described, provides extremely simple means for properly positioning the blades of a sticker head, the work being accomplished in a set up block where there is sufficient room to readily manipulate the blades relative to the sticker head, and by the arrangement of the parts of the apparatus in a definite fixed relation, the proper adjustment of the cutter blades, when the sticker head is mounted in the set up block, will cause said cutter blades to also be properly positioned when the sticker head is subsequently transferred to the planing machine.

Various changes may be made without departing from the spirit of the invention as claimed.

What is claimed is:

1. A set-up apparatus for adjusting the position of cutters on a sticker head, comprising a box-like casing having a back and ends and an open front, a frame slidably mounted upon the end walls and having a pendant front apron between the end walls, means on the apron to clamp a pattern block, and a removable, head mandrel mounted in the end walls and toward which the apron is shiftable to set the pattern.

2. A set-up apparatus for adjusting the position of cutters on a sticker head, comprising a box-like casing having a back and ends and an open front, a frame slidably mounted upon the end walls and having a pendant front apron between the end walls, means on the apron to clamp a pattern block, a removable, head mandrel mounted in the ends walls and toward which the apron is shiftable to set the pattern, and illuminating means below and in front of the apron for facilitating setting up of the pattern and cutters on the head.

3. A set-up apparatus for adjusting the position of cutters on a sticker head, comprising a box-like casing having a back and ends and an open front, a frame slidably mounted upon the end walls and having a pendant front apron between the end walls, means on the apron to clamp a pattern block, a removable, head mandrel mounted in the end walls and toward which the apron is shiftable to set the pattern, the clamp including an upper adjustable jaw, and means extending to the top of the frame for adjusting the jaw.

4. A set-up apparatus for adjusting the position of cutters on a sticker head, comprising a box-like casing having a back and ends and an open front, a frame slidably mounted upon the end walls and having a pendant front apron between the end walls, means on the apron to clamp a pattern block, and a removable, head mandrel mounted in the end walls and toward which the apron is shiftable to set the pattern, the tops of the end wall forming half bearings with open seats into which the said mandrel is readily applied and therefrom removed.

In testimony whereof I have signed my name to this specification.

ARTHUR F. CURTIS.